United States Patent [19]

Leone et al.

[11] Patent Number: 4,789,577

[45] Date of Patent: Dec. 6, 1988

[54] MULTICHANNEL STRUCTURES MADE OF COMPOSITES, PROCESSES AND SEMIFINISHED PRODUCTS FOR THE MANUFACTURE THEREOF

[75] Inventors: Michel Leone, La Crau; Robert Carbone, La Garde, both of France

[73] Assignee: Etat Francais, Paris, France

[21] Appl. No.: 895,865

[22] Filed: Aug. 12, 1986

[30] Foreign Application Priority Data

Sep. 11, 1985 [FR] France ............... 85 13452

[51] Int. Cl.⁴ ...................... D03D 13/00; B32B 31/00
[52] U.S. Cl. .................................. 428/34.5; 156/244; 428/222; 428/408; 428/902; 428/36.1
[58] Field of Search ............... 428/36, 221, 224, 222, 428/902, 408; 156/294, 305, 167

[56] References Cited

U.S. PATENT DOCUMENTS 3,556,448 1/1971 Dobbs .................................. 428/251
3,965,942 6/1976 Hatch .................................. 428/225
4,090,002 5/1978 Rosenblum ........................... 428/36
4,112,159 9/1978 Pall .................................... 428/222
4,389,447 6/1983 Disselbeck et al. ................... 428/223

Primary Examiner—James J. Bell
Attorney, Agent, or Firm—Parkhurst, Oliff & Berridge

[57] ABSTRACT

The invention concerns low density multichannel structures made of composites, processes and semifinished products for the manufacture thereof.

A multichannel laminated resin structure according to the invention includes cellular fabric (1) defining a row of parallel ducts in each of which is inserted a fitted tubular extrusion (3). The semifinished product is placed between the external reinforcement layers (4, 5). The cellular fabric and reinforcement layers are embedded in a curable resin (6).

One application is the manufacture of boat hulls or airframes for light aircraft, noncorrodible and very good mechanical properties.

8 Claims, 2 Drawing Sheets

MULTICHANNEL STRUCTURES MADE OF COMPOSITES, PROCESSES AND SEMIFINISHED PRODUCTS FOR THE MANUFACTURE THEREOF

This invention concerns low density multichannel structures made of composites, processes and semifinished products for manufacture thereof.

The technical sector of the application is the manufacture of hulls or panels with high mechanical performance.

It is known that aeronautical and naval structures use composites consisting of multichannel structures, for instance honeycomb sandwich structures, which allow a reduction in weight and ensure good mechanical properties. Such multichannel composite structures are for instance used in manufacture of airframes and boat hulls.

One of the objectives of this invention is to yield composite multichannel structures which may include several stacked layers with the channels in crossed directions in order to align these directions and thereby the lines of best mechanical strength of the end product with the direction of the stresses to be supported.

For instance, patents FR No. 1 074 766, FR No. 1 587 529 and U.S. Pat. No. 3,556,448 describe such lightweight multichannel structures made of composites, with several layers mainly including longitudinal ducts determined by two crossed layers of fabric. Tubular extrusions made of lightweight materials are inserted in these ducts for the sole purpose of decreasing the weight of the structure. The mechanical strength must therefore be ensured by the cellular fabric itself or by external reinforcement layers. It is therefore limited by these known technologies. In addition, these manufacturing processes do not allow an intermediate product to be obtained which has both high longitudinal strength in the direction of the cells and high flexibility in the cross direction, thereby facilitating forming of the final structure which may be flat or curved.

Another objective of this invention is to facilitate the manufacture of composite multichannel structures by the use of a semifinished product.

The objectives of the invention are achieved by a composite multichannel structure manufacturing process which includes the following sequence of operations:
 a cellular fabric is produced by crossing layers thus forming parallel, juxtaposed ducts; the crosspoints are joints allowing forming
 in each duct is inserted a tubular extrusion with high mechanical properties and low density and fitted to the duct
 the semifinished product thus obtained is formed by suitable tooling
 one or more reinforcement layers are extended on the surface of the cellular fabric
 the cellular fabric and reinforcement are then embedded in a curable resin which is cured.

The invention yields new composite multichannel structures consisting of a cellular fabric including parallel, juxtaposed ducts, tubes each inserted in one of the ducts, one or more reinforcement layers on either side of the cellular fabric containing the tubes and cured resin surrounding the tubes and in which the cellular fabric and reinforcement are embedded.

One advantage of the process according to the invention resides in the fact that the layers of cellular fabric can be mass prepared and mechanically produced, each cell being fitted with a tube, and that said layers can readily be stored, shipped, handled and installed on production tooling, for instance molds, thereby forming a semifinished product which facilitates manufacture of multichannel structures.

Another advantage of the process according to the invention resides in the fact that the layers of cellular fabric, each cell being fitted with a tube, can be strongly curved in the crosswise direction and slightly curved in the lengthwise direction using the sag obtained over great lengths, which allows panels or hulls with a high crosswise curvature to be manufactured, for instance tubes or airframes and even surfaces with a double curvature with a low curve radius in the crosswise direction with respect to the tubes and a high curve radius in the lengthwise direction.

Another advantage of the process according to the invention resides in the fact that it allows composite multichannel structures with crossed layers to be obtained to improve resistance to stresses in crossed directions.

The tubes embedded in the structure are for instance high strength pultruded reinforced tubes, lending very high strength to the structure in the direction lengthwise to the tubes. The reinforcement layers which can be oriented in directions suited to the stresses, the cellular fabric and the partitions thereof give the structures good mechanical strength.

The structures according to the invention have the advantage that the tubes comprising them can be sealed by blanking the two ends.

The tubes embedded in the resin allow an increase in the moment of inertia and mechanical strength without an increase in weight.

The following description refers to the drawings in appendix which represent, with no restrictive character, examples of embodiment of multichannel structures according to the invention.

FIG. 1a represents a semifinished product used in the multichannel structure manufacturing process according to the invention.

This semifinished product includes cellular fabric 1, obtained by crossing two layers, thereby forming parallel, juxtaposed ducts 2 fitting all forms of tubular extrusion 3.

Figure 1A:
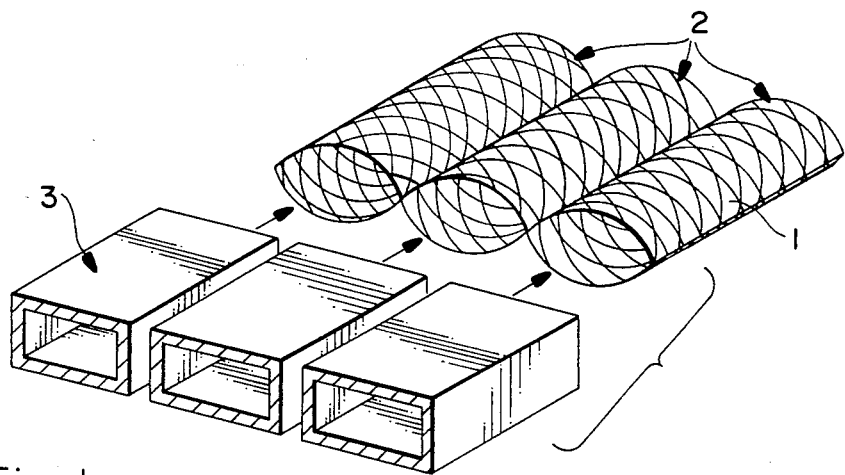
FIG. 1a is a partial perspective exploded view of the components of a semifinished product according to the invention.
Figure 1B:
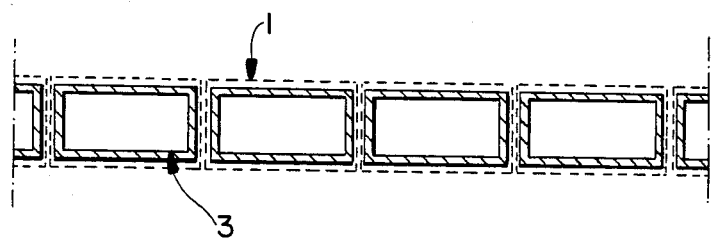
FIG. 1b is a partial cross section of the same semifinished product.

In each duct is inserted a tubular extrusion 3 whose rectangular cross section fits that of the duct such that the duct surrounds tube 3 (FIG. 1b).

The function of cellular fabric 1 is to group tubes 3 in a semifinished product as a layer which can be readily handled. Cellular fabric 1 can be a net or preferably a tight-woven fabric made of fibers such as glass or carbon fibers or any other fibers used to make the reinforcements of laminated products.

Tubular extrusions 3 are for instance pultruded tubes obtained by drawing resin-impregnated glass fibers through a draw plate. They can also be plastic extrusions.

Figure 2:
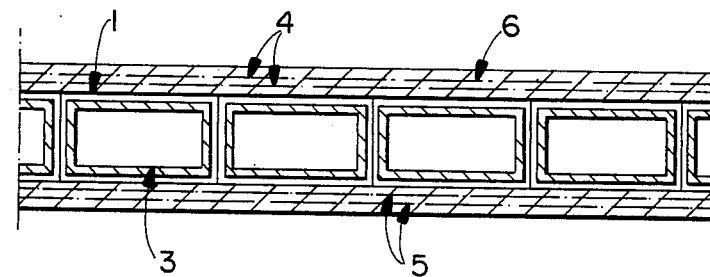
FIG. 2 is a partial cross section of a multichannel structure according to the invention.

FIG. 2 shows a partial cross section of a multichannel structure according to the invention.

In FIG. 2 can be seen tubes 3, each inserted in a duct of fabric 1.

The structure also includes one or more reinforcement layers 4 and 5 shown as combination lines, located on either side cellular fabric 1.

Reinforcement layers 4 and 5 and cellular fabric 1 are embedded in curable resin 6.

FIG. 2 shows the example of a flat panel.

Figure 3A:
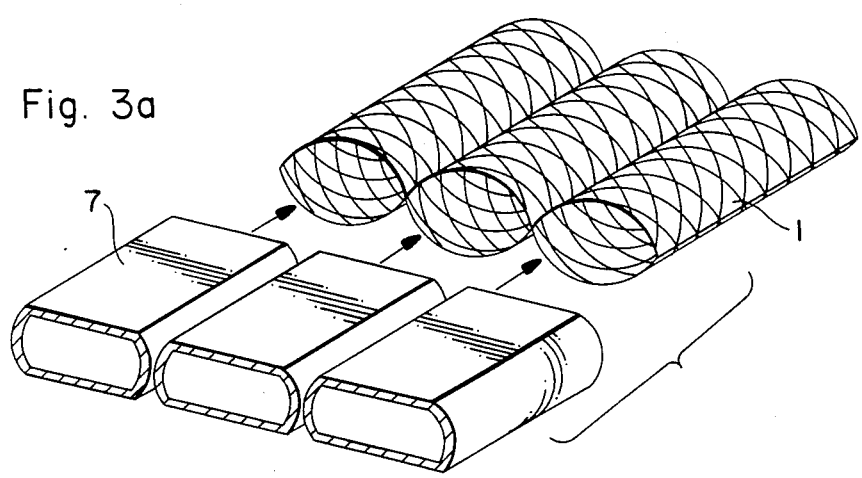
FIG. 3a is a partial perspective exploded view of the components of a second semifinished product according to the invention.

FIG. 3 is a perspective exploded view of the embodiment of another semifinished product according to the invention. It includes the same cellular fabric 1.

In each of the ducts is inserted tubular extrusion 7 fitted to the duct with, for instance, a roughly rectangular cross section with rounded edges or even a circular cross section.

Fabric 1 is preferably a fabric made of glass or carbon fibers or any other fibers commonly used to form the reinforcements in composite products.

Tubes 7 are for instance pultruded glass or carbon tubes or extruded resin tubes.

Figure 3B:
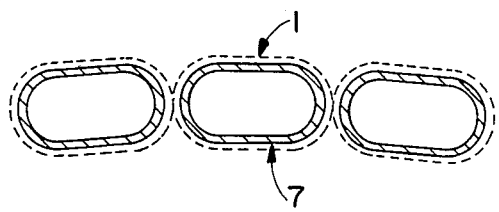
FIG. 3b is a partial cross section of this semifinished product.
Figure 4:
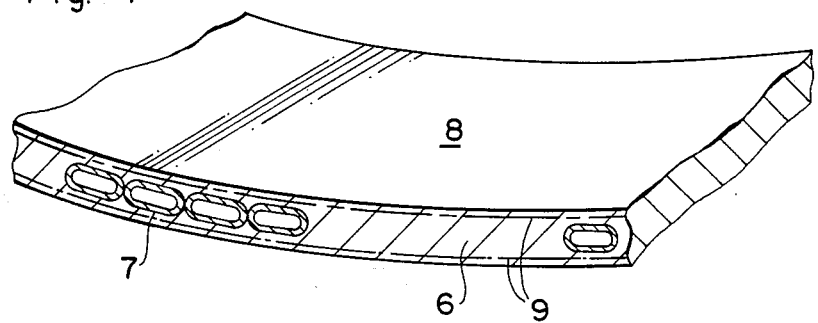
FIG. 4 is a partial perspective view of a curved structure according to the invention with a single layer of channels.

FIG. 4 shows curved surface 8 manufactured with a semifinished product according to FIG. 3, embedded in cured resin 6 with one or more external reinforcement layers 9 shown as combined lines interposed between the semifinished product and the lateral surfaces. Surface 8 is curved in the direction crosswise to the axis of tubes 7 and it is possible to obtain a relatively low curve radius in this direction since the semifinished product according to FIG. 3b can easily be bent in this direction.

In addition, using the sag of the extrusion over great lengths, it is possible to manufacture parts which also have a slight curvature lengthwise to the tubes.

Figure 5:
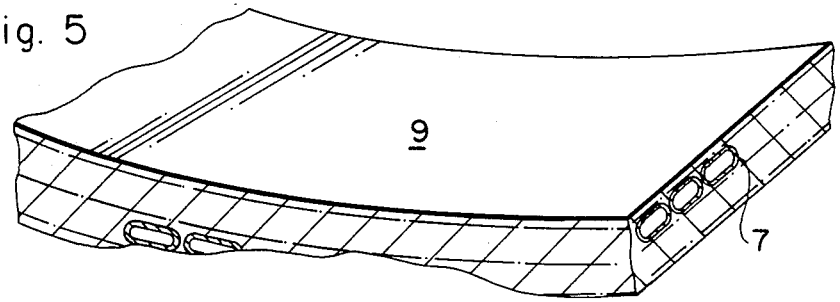
FIG. 5 is a partial perspective view of a curved structure according to the invention with two layers of channels in crossed directions.

FIG. 5 shows curved plate 9 produced by stacking two semifinished products according to FIG. 3, crossing the directions of tubes 7 so that such a surface is capable of withstanding stresses in crossed directions. Combined lines 10 are reinforcement layers located between the two layers of tubes and on either side thereof.

If the end products are designed to be immersed in water, for instance boat hulls, tubular extrusions 3 or 7 can be blanked at the ends to seal them and, as they are also waterproof, there is no risk of ingress of water in the channels of the structure in case of local damage.

Many technologies can be implemented in a multichannel structure manufacturing process according to the invention.

According to a first technology, one or more external reinforcement layers 7 are first placed in the bottom of a mold and impregnated with curable resin. The semifinished products consisting of tubes inserted in the ducts of a cellular fabric are then placed on this first layer and the fabric is impregnated with curable resin. Finally, one or more layers of the second external reinforcement are placed on top and impregnated with curable resin, then the entire assembly is cured in the case of a structure with a single layer of channels.

To make a structure with several layers of channels, crossed or not, a second layer of semifinished product is placed on the reinforcement layers above the first layer of channels, then new reinforcement layers are placed on top and so forth.

To make products with a single or double curvature, the operations are carried out in a curved mold.

According to a second technology, the external reinforcement layers can be layers of prepreg which has not been fully cured. In this case, it is sufficient to place one or more external reinforcement layers in the bottom of a mold, then a semifinished product designed as core of the end product on top, then one or more external reinforcement layers on top, then to cure the assembly.

Multichannel composite structures according to the invention include one or more stacked layers of channels which can be used to manufacture all types of lightweight, noncorrodible structures with very good mechanical properties, such as the hulls of boats, aircraft fuselages, partitions, floors, etc.

To manufacture a flat end product with several layers of channels, two flat multichannel layers can be produced separately, each with a single row of channels, then the two layers can be stacked, crossing the directions of the channels and bonding them together.

To produce an end product according to FIG. 5 with several layers of channels and a curvature, it is easier to form the two layers one after the other in the same mold before curing the resin.

According to a third technology, the semifinished product is placed on frames giving the desired curvatures, one or more reinforcement layers are then placed on one of the surfaces, impregnated with curable resin and the assembly is cured. After overturning the structure onto the other surface, one or more reinforcement layers are installed, impregnated with curable resin and cured.

According to another technology, the external reinforcement layers can be layers impregnated with resin which is not fully cured. In this case, the process is the same as above, as curing can take place in one or two stages.

Finally, according to another technology, when producing multichannel structures according to the invention in cylindrical shapes, external reinforcement layers 9 can be made by winding, i.e. of filaments wound spirally around the cellular fabric containing the tubular extrusions. This operation is carried out on a winding machine.

We claim:

1. A process for producing a low density composite multichannel structure comprising the steps of:
   providing a cellular fabric having parallel, juxtaposed ducts, said cellular fabric being produced by crossing two layers to form said ducts;
   inserting tubular extrusions with high mechanical properties and low density into said ducts to produce a semfinished product wherein each duct has one tubular extrusion axially fitted therein;
   positioning at least one reinforcement layer on each surface of the cellular fabric of the semifinished product;
   impregnating the reinforcement layers and the cellular fabric with a curable resin;
   curing the curable resin to produce a low density composite multichannel structure.

2. The process of claim 1 wherein said tubular extrusions are rectangular cross section and said low density composite multichannel structure is flat.

3. The process of claim 1 wherein said tubular extrusions have a generally rectangular cross section with rounded edges or a circular cross section and said low density composite multichannel structure is curved.

4. The process of claim 1 wherein said reinforcement layers are preimpregnated with resin prior to being positioned on the surfaces of the semifinished product.

5. A low density composite multichannel structure comprising:
   a cellular fabric comprising two crossed layers which define a plurality of parallel juxtaposed ducts;
   a plurality of tubular extrusions with high mechanical strength, one of said tubular extrusions being axially fitted in each of said ducts of the cellular fabric;
   at least one external reinforcement layer located on each outer surface of the cellular fabric; and
   a cured resin surrounding said tubular extrusions, said cured resin having said cellular fabric and said reinforcement layers embedded therein.

6. A multichannel structure of claim 5, wherein two stacked cellular fabrics fitted with tubular extrusions oriented in crossed directions are placed between the reinforcement layers and embedded in the cured resin.

7. A semifinished product useful in the manufacture of a multichannel structure, said semifinished product comprising a cellular fabric having two intersecting layers which define a plurality of parallel, juxtaposed ducts, and a plurality of tubular extrusions with high mechanical strength, wherein each of said ducts has one of said tubular extrusions axially fitted therein.

8. A multichannel structure of claim 5, wherin the external reinforcement layers are made by winding.

* * * * *